July 29, 1941.   L. A. CROW   2,250,469
CLASP
Filed Feb. 5, 1940
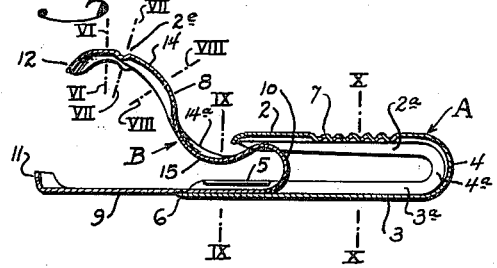
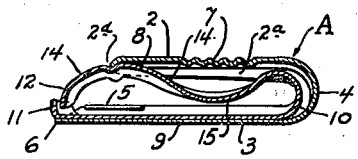
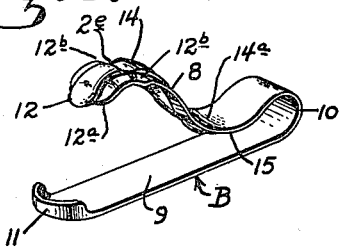
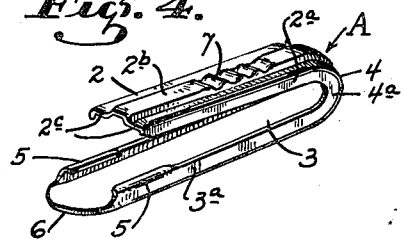
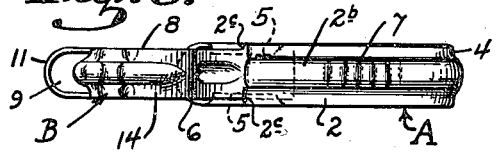
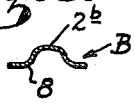
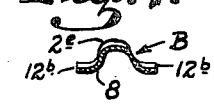
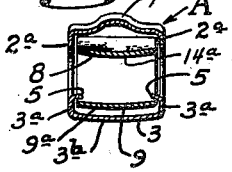
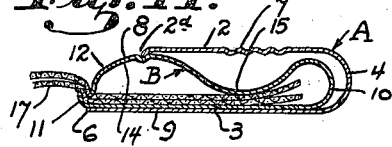
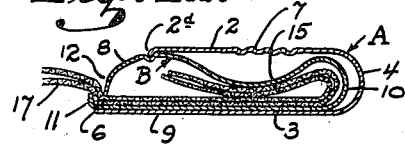
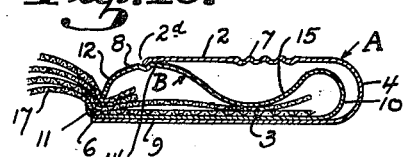
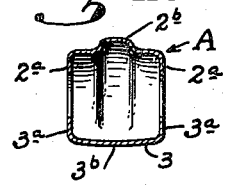
INVENTOR.
Lester A. Crow.
BY
Chas. E. Townsend.
ATTORNEY.

Patented July 29, 1941

2,250,469

UNITED STATES PATENT OFFICE 2,250,469

CLASP

Lester A. Crow, Santa Rosa, Calif., assignor of five per cent to C. M. Fleissner, Santa Rosa, Calif., sixteen per cent to Carl Sullivan and twelve and one-half per cent to R. W. McElyea, Palo Alto, Calif.

Application February 5, 1940, Serial No. 317,340

10 Claims. (Cl. 24—260)

This invention relates to a clasp gripping member which is particularly intended for use in connection with the safe fastening of babies' diapers, blankets, sanitary napkins, costume jewelry, etc.

The object of the present invention is generally to simplify and improve the construction and operation of clasps of the character described; to provide a clasp gripping member whereby the use of pins, whether of the safety pin type, straight, or otherwise, may be entirely eliminated in the fastening or securing of babies' diapers, blankets, etc., and which will provide a safe method of securing costume jewelry to delicate fabrics without injuring the same; to provide a clasp gripping member which may be applied to and embrace a number of layers of cloth of varying thickness at different points, as in the fastening of babies' diapers, where the edges may be curled or unevenly folded, so as to present uneven thickness where gripped by the clasp; and further, to provide a clasp gripping member which presents smooth exterior surfaces to prevent injury to the tender skin of babies.

The clasp is shown by way of illustration in the accompanying drawing, in which

Fig. 1 is a central, vertical, longitudinal section showing the clasp in open position.

Fig. 2 is a similar section showing the clasp in closed position.

Fig. 3 is a perspective view of the gripping member.

Fig. 4 is a perspective view of the keeper.

Fig. 5 is a plan view of Fig. 1.

Fig. 6 is a cross section of the upper gripping arm taken on line 6—6, Fig. 1.

Fig. 7 is a cross section of the upper gripping arm taken on line 7—7, Fig. 1.

Fig. 8 is a cross section of the upper gripping arm taken on line 8—8, Fig. 1.

Fig. 9 is a cross section taken on line 9—9, Fig. 1.

Fig. 10 is a cross section taken at line 10—10, Fig. 1.

Figs. 11, 12 and 13 are diagrammatic sectional views showing the different positions assumed by the upper gripping arm when materials of varying thickness are encountered.

Referring to the drawing in detail, and particularly to Figs. 1 to 4 inclusive, it will be noted that the clasp, broadly stated, comprises two cooperating members which, generally speaking, are U-shaped. There is an outer member A which will be referred to as a combination keeper and actuator, and there is an inner member B which will be referred to as the gripping member. The gripping member is mounted within the keeper or actuator, and the two are relatively slidable with relation to each other, as they may assume one or another of the positions shown in Figs. 1 and 2.

The combination keeper and actuator consists of a stamped piece of metal bent upon itself to form upper and lower arms 2 and 3, which are connected at 4. The connecting portion 4 and the arms themselves have a slight springing action, but should be fairly rigid, and for this reason are provided with right-angular continuous side flanges 2a, 3a and 4a. These flanges also serve another function, to-wit: that of a guide for the gripping member and to secure it against lateral movement within the keeper. To further increase rigidity, the upper arm is provided with a central longitudinally extending rib 2b, and the lower arm is made arcuate in cross section, as shown as 3b in Fig. 9. Two in-turned lips 5 are formed on the lower arm, and just in front of said lips the arm terminates in a rounded nose 6. The rib 2b on the upper arm is corrugated as at 7, to form a roughened gripping surface or finger hold, and the front end is bent downwardly on each side of the rib, to form latching jaws 2c, as will later be described, and the front end terminates in a latch 2d which will also be described.

The gripping member B is also stamped from metal—in this instance, stainless spring steel or similar suitable material and it is bent upon itself to form upper and lower gripping arms 8 and 9 connected by an eye 10. The lower arm of the gripping member is straight in a longitudinal direction, but in cross section it is arcuate as shown as 9a (see Fig. 9) to conform to the cross sectional shape of the lower arm 3 of the combination keeper and actuator.

The forward end of the lower arm terminates in a rounded nose, which is provided with an upturned flange forming a gripping jaw 11. The lower arm is slightly longer than the upper, to permit a nose or jaw 12 on the forward end of the upper arm to enter slightly behind the jaw 11 when the gripping member is closed as shown in Figs. 2 and 11 to 13 inclusive. The upper arm is bent and longitudinally ribbed to form a hump-shaped surface 14, and behind or between it and the eye 10 a reverse bend 15; the reverse bend is arcuate in cross-section as indicated at 14a, i. e. the upper arm should be fairly rigid throughout its length and should under normal conditions bend at the eye portion 10 and also slightly at the reverse bend 15 when gripping. The rib 14a terminates in the jaw 12. At the point 2e is a recess which cooperates with the latch 2d, and on opposite sides of the rib near the recess 2e are recesses 12b which cooperate with the latching jaws 2c, as will be described.

In actual practice the gripping member is mounted in the combination keeper and actuator, and is slidable therein from the closed position shown in Fig. 2 to the full open position shown in Fig. 1; and is guided and retained against lateral movement by the side flanges 2a and 3a. Outward movement beyond the full open position shown in Fig. 1 is prevented by the inturned lips 5.

To apply the clasp, as in fastening diapers, it is grasped when in its open position by the thumb and index finger of one hand, the index finger engaging the under surface of arm 3 and the thumb engaging the roughened surface formed on the upper arm 2 of the combination keeper and actuator. When so held, the open outer ends of the gripping member are positioned over and under the edge 17 of the fabric to be gripped, and the clasp as a whole is then pushed inwardly until the edge of the fabric enters the eye 10 (see Fig. 11). Further inward movement will cause the front end of arm 2 to engage the hump-shaped surface 14 of arm 8 forcing said arm down to assume the position shown in Fig. 2, where the jaw 12 will assume a gripping position behind the jaw 11, and cooperate therewith to form a secure grip on the fabric. Plainly speaking, the clasp is applied to the fabric by a push action, and is removed by merely exerting a pull on the keeper or actuator, as when a pull is exerted the actuator moves outwardly with relation to the gripping member, to assume the position shown in Fig. 1, thereby permitting the gripping member to open and release its grip. When the clasp is fully closed, as shown in Fig. 2, the actuator is latched or retained with relation to the gripping member against accidental release, as the latching jaws 2c on the forward end of arm 2 will engage the recesses 12b formed behind the jaw 12 of the gripping arm 8; or these members may be eliminated and latch 2d may be employed to enter the recess 2e and thereby to secure the members against release. In this connection it might be stated that when the latching members engage, there is a slight metallic click; also this engaging can be noted by its sensation on the fingers. This is desirable as it indicates to the user that the clasp has been fully applied. In some instances, particularly when using the clasp in connection with babies' diapers and the like, considerable flexibility or self-adjustment of the gripping arm 8 is required, as the fabric grasped presents a thickness which may vary to a considerable degree. For instance, in Fig. 11 fabric in several layers but of uniform thickness is illustrated; in that instance a double and approximately equal grip is obtained at the jaw 12 and under the reverse bend 15. In Fig. 12 the fabric is shown as doubled over, so as to present the greatest thickness under the reverse bend 15; in that case the reverse bend on the gripping arm forms a grip on the cloth, the cloth in turn tends to straighten the bend, and slightly expand the eye, and in so doing, applies a rocker action against arm 2 to apply further pressure to the jaw end 12, thus automatically tending to equalize the grips at both holds. Conversely, if the cloth or fabric layers are thickest at the point gripped by jaw 12, the hump-shaped surface 14 acts against the upper arm 2 and imparts a greater bend to the reverse bend 15, as shown in Fig. 13, causing it to apply a gripping action to the layers of fabric disposed under the same.

In other words, a clasp is provided which presents two clamping or gripping portions, and these may, through reaction with arm 2 of the actuator, transmit pressure from one to the other. When the reverse bend 15 opens or tends to straighten the upper gripping arm, as in Fig. 12, that arm will lengthen to a certain degree; conversely, when the reverse bend 15 is increased by increased thickness of fabric under the gripping jaw 12, the arm will tend to shorten. Such lengthening or shortening is automatically compensated by the eye member 10, as it merely opens or partially closes, as the case may be. This flexibility of the arm 8 is of obvious importance when varying thicknesses of fabric, etc., is encountered.

The rounded flanged jaw at the forward end of arm 9 is also of great importance, particularly when the clasp is used in connection with diapers, as this arm is often introduced between the diaper and the tender skin of a baby. It can do no harm, as smooth rounded surfaces are presented; and this is also true of the other parts of which the clasp is formed. In connection with the flexibility of the clasp, it might also be pointed out that while arms 2 and 3 of the combination keeper and actuator have been described as being comparatively rigid, there is a certain amount of spring between the outer ends of the arms; this is also important as it further increases the flexibility of the clasp as a whole, by yielding to varying thicknesses of fabric encountered. The reverse bend portion 15 of the upper gripping arm 8 would appear to possess a clamping action only, but this is not the case. By referring to Fig. 9 it will be noted that the portion 15 forces the fabric down between the side flanges 3a, where there is an actual gripping action, and this is important as it secures the clasp as a whole, and the fabric gripped, against lateral release.

While the clasp has been particularly described as used and applied to babies' diapers, it is obviously entitled to use wherever useful or applicable, for instance in conjunction with costume jewelry, badges and the like, by fastening the arm 2 by soldering or otherwise, to the badge or jewelry; again, the surface of arm 2 might be ornamental. Be it noted also, that when the clasp is pulled from its hold on the material, the arm 8 of the gripping member automatically springs open and the clasp is left ready for reuse without any preliminary operation. While these and other features of my invention have been more or less specifically described, I wish it understood that changes may be be resorted to within the scope of the appended claims.

Having thus described my invention, what I claim and desire to secure by Letters Patent is:

1. A clasp of the character described comprising a keeper having an upper arm and a lower arm spaced apart and connected at one end, said arms being substantially parallel and rigid, an upper and a lower gripping arm connected at one end by a spring eye, said eye and arms being slidably mounted between the arms of the keeper to assume either an inner closed position or an outer open position, and a hump-shaped surface formed on the upper gripping arm and engageable with one of the keeper arms to close said gripper arm with relation to the lower gripper arm.

2. A clasp of the character described comprising a keeper having an upper and a lower arm spaced apart and connected at one end, said arms being substantially parallel and rigid, an upper and a lower gripping arm connected at one end by a spring eye, said eye and arms being slidably mounted between the arms of the keeper to assume either an inner closed position or an outer open position, a hump-shaped surface formed on the upper gripping arm and engageable with one of the keeper arms to close said gripper arm with relation to the lower gripper arm, and a gripping jaw formed at the outer end of each gripping arm.

3. A clasp of the character described comprising a keeper having an upper and a lower arm spaced apart and connected at one end, said arms being substantially parallel and rigid, an upper and a lower gripping arm connected at one end by a spring eye, said eye and arms being slidably mounted between the arms of the keeper to assume either an inner closed position or an outer open position, a hump-shaped surface formed on the upper gripping arm and engageable with one of the keeper arms to close said gripper arm with relation to the lower gripper arm, and a gripping jaw formed at the outer end of each gripping arm, said upper gripping jaw seating behind the lower gripping jaw when the jaws are closed.

4. A clasp of the character described comprising a keeper having an upper and a lower arm spaced apart and connected at one end, said arms being substantially parallel and rigid, an upper and a lower gripping arm connected at one end by a spring eye, said eye and arms being slidably mounted between the arms of the keeper to assume either an inner closed position or an outer open position, a hump-shaped surface formed on the upper gripping arm and engageable with one of the keeper arms to close said gripper arm with relation to the lower gripper arm, a gripping jaw formed at the outer end of each gripping arm, and a reverse bend formed on the upper gripping arm intermediate the hump-shaped surface and the spring eye.

5. A clasp of the character described comprising a keeper having an upper and a lower arm spaced apart and connected at one end, said arms being substantially parallel and rigid, an upper and a lower gripping arm connected at one end by a spring eye, said eye and arms being slidably mounted between the arms of the keeper to assume either an inner closed position or an outer open position, a hump-shaped surface formed on the upper gripping arm and engageable with one of the keeper arms to close said gripper arm with relation to the lower gripper arm, and means on the keeper securing the gripping arms against lateral movement with relation thereto.

6. A clasp of the character described comprising a keeper having an upper and a lower arm spaced apart and connected at one end, said arms being substantially parallel and rigid, an upper and a lower gripping arm connected at one end by a spring eye, said eye and arms being slidably mounted between the arms of the keeper to assume either an inner closed position or an outer open position, a hump-shaped surface formed on the upper gripping arm and engageable with one of the keeper arms to close said gripper arm with relation to the lower gripper arm, means on the keeper securing the gripping arms against lateral movement with relation thereto, and other means limiting longitudinal movement of the gripping arms with relation to the keeper.

7. A clasp of the character described comprising a substantially U-shaped rigid keeper, a gripping member comprising an upper and a lower arm connected at one end by a spring eye, said gripping member being slidably mounted in the keeper to assume an inner closed position or an outer open position, a gripping jaw on the outer end of each gripping arm, and a reverse bend formed on the upper gripping arm intermediate its ends to form a two-point grip on fabric placed between the arms of the gripping member.

8. A clasp of the character described comprising a substantially U-shaped rigid keeper, a gripping member comprising an upper and a lower arm connected at one end by a spring eye, said gripping member being slidably mounted in the keeper to assume an inner closed position and an outer open position, a gripping jaw on the outer end of each gripping arm, a pair of flanges formed one on each side of the lower arm of the keeper, and a reverse bend formed in the upper arm of the gripping member intermediate its ends, said flanges cooperating with the reverse bend to grip fabric placed between them, and said gripping jaws cooperating to grip the same fabric.

9. A clasp of the character described comprising a keeper having an upper and a lower arm spaced apart and connected at one end, said arms being substantially parallel and rigid, a right-angular flange on each side of each arm, said flanges extending from end to end and around the connection between the arms, said flanges increasing the rigidity of said arms and forming guideways between the arms; an upper and lower gripping arm connected at one end by a spring eye, said eye and arms being slidably mounted in the guideways formed in the keeper from an inner closed position to an outer open position, and a pair of in-turned lips on the outer end of the lower keeper arm engageable with the eye connecting the gripper arms to limit outward sliding movement of the gripper arms with relation to the keeper arms.

10. A clasp of the character described comprising a keeper having an upper and a lower arm spaced apart and connected at one end, said arms being substantially parallel and rigid, an upper and a lower gripping arm connected at one end by a spring eye, said eye and arms being slidably mounted between the arms of the keeper to assume either an inner closed position or an outer open position, a hump-shaped surface formed at the outer end of the upper gripping arm, said hump being engageable with the upper keeper arm to close the upper gripper arm with relation to the lower gripper arm and a latch on the outer end of the upper gripper arm said latch adapted to enter a recess formed in the hump-shaped surface of the upper gripper arm to prevent accidental release of the gripper arms when closed.

LESTER A. CROW.